(12) United States Patent
Chu et al.

(10) Patent No.: US 8,928,973 B2
(45) Date of Patent: Jan. 6, 2015

(54) MICROSCOPE APPARATUS FOR PHASE IMAGE ACQUISITION

(75) Inventors: Fu-Sheng Chu, Zhubei (TW);
Chih-Shiang Chou, Pingzhen (TW);
Yu-Po Tang, Taipei (TW); Yan-Ying He, Taipei (TW)

(73) Assignee: Taiwan Semiconductor Manufacturing Company, Ltd. (TW)

( * ) Notice: Subject to any disclaimer, the term of this patent is extended or adjusted under 35 U.S.C. 154(b) by 87 days.

(21) Appl. No.: 13/328,591

(22) Filed: Dec. 16, 2011

(65) Prior Publication Data
US 2013/0155498 A1 Jun. 20, 2013

(51) Int. Cl.
*G02B 21/00* (2006.01)

(52) U.S. Cl.
USPC ........................................... 359/371; 359/370

(58) Field of Classification Search
USPC ................ 359/370–372, 379, 368, 577–578, 359/450–453, 456, 237.1, 239.1, 239.3, 359/237.6
See application file for complete search history.

(56) References Cited

U.S. PATENT DOCUMENTS

| | | | |
|---|---|---|---|
| 5,661,560 A * | 8/1997 | Ozaki | 356/364 |
| 5,969,856 A * | 10/1999 | Greenberg | 359/390 |
| 6,583,624 B1 * | 6/2003 | Muthupillai et al. | 324/309 |
| 8,218,152 B1 * | 7/2012 | Marks et al. | 356/497 |
| 2008/0225921 A1 * | 9/2008 | Kuss et al. | 372/57 |
| 2011/0032479 A1 * | 2/2011 | Utsunomiya | 351/206 |

FOREIGN PATENT DOCUMENTS

WO  WO 2011029535 A2 *  3/2011

* cited by examiner

*Primary Examiner* — William Choi
*Assistant Examiner* — Sharrief Broome
(74) *Attorney, Agent, or Firm* — Lowe Hauptman & Ham, LLP

(57) ABSTRACT

A microscope apparatus includes a condenser lens to make an illuminating electromagnetic wave relatively homogeneous, a first beam splitter splitting the illuminating electromagnetic wave after the condenser lens, a movable reflector module, a second beam splitter, an objective lens to project the illuminating electromagnetic wave propagating after an object to be observed toward an observing device. The object is loaded between the first beam splitter and the second beam splitter. The microscope apparatus is configured to split the illuminating electromagnetic wave into two paths at the first beam splitter. A first path goes through the first and the second beam splitters, and a second path goes through the movable reflector module to rejoin the first path at the second beam splitter. The microscope apparatus is configured acquire phase images with interferences of the electromagnetic wave from the two paths with at least two distance settings of the movable reflector module.

20 Claims, 4 Drawing Sheets

MICROSCOPE APPARATUS FOR PHASE IMAGE ACQUISITION

TECHNICAL FIELD

The present disclosure relates generally to a microscope.

BACKGROUND

A microscope system is used to acquire the intensity images of objects. For integrated circuit fabrication, a photomask image is acquired using a microscope to predict patterns to be formed in a resist layer on a wafer.

BRIEF DESCRIPTION OF THE DRAWINGS

Reference is now made to the following descriptions taken in conjunction with the accompanying drawings, in which.

DETAILED DESCRIPTION

The making and using of various embodiments are discussed in detail below. It should be appreciated, however, that the present disclosure provides many applicable inventive concepts that can be embodied in a wide variety of specific contexts. The specific embodiments discussed are illustrative of specific ways to make and use, and do not limit the scope of the disclosure.

In addition, spatially relative terms, for example, "lower," "upper," "horizontal," "vertical," "above," "below," "up," "down," "top," "bottom," etc. as well as derivatives thereof (e.g., "horizontally," "downwardly," "upwardly," etc.) are used for ease of the present disclosure of one features relationship to another feature. The spatially relative terms are intended to cover different orientations of the device including the features.

Figure 1:
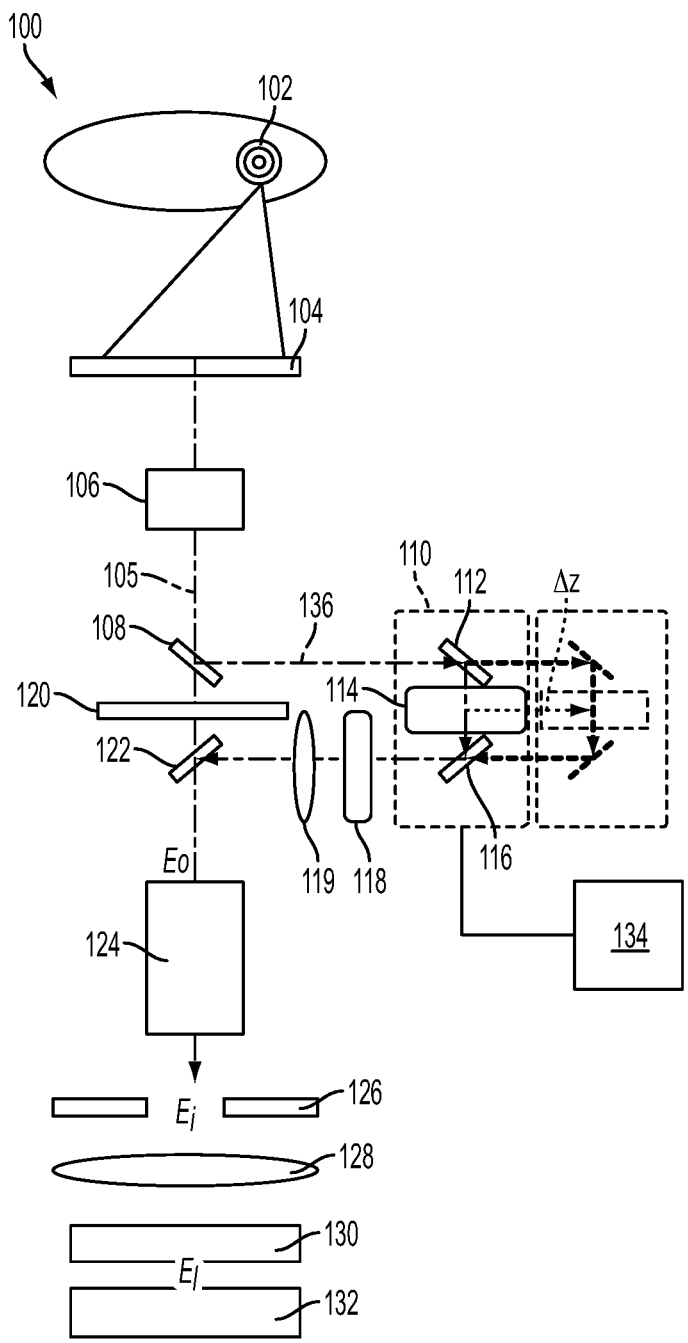
FIG. 1 is a schematic diagram of an exemplary microscope apparatus for phase image acquisition according to some embodiments.

FIG. 1 is a schematic diagram of an exemplary microscope apparatus for phase image acquisition according to some embodiments. The microscope apparatus 100 includes an electromagnetic wave source 102 ("source"), e.g., a point source with off-axis illumination (OAI)/free form illumination (FFI), a coherent source, or any other suitable source. The illuminating electromagnetic wave from the source 102 is not limited to (visible) light, but the terms "light" and "optical" are used as examples in the following for illustration. Also, the microscope apparatus 100 acquires phase images of a photomask 120 ("mask") in one example. However, the microscope apparatus 100 can be used to acquire phase images of other objects.

A polarizer (polarizing filter) 104 polarizes the (illuminating) light from the source 102. For example, light passing through the polarizer 104 oscillates in only one direction, and is referred to as polarized light (and in at least one embodiment, a linear polarized light). A condenser lens 106 concentrates the light from the source 102 to provide a relatively (or generally) homogeneous illumination. Beam splitters 108 and 122 are used to split or recombine/rejoin the light.

In some embodiments, the source 102, the polarizer 104, the condenser lens 106, the beam splitters 108 and 122, and the objective lens 124, the NA turn table 126, the Bertrand lens 128, the tube lens 130, and the camera 132 are aligned along an axis 105 and these elements are held by any suitable housing or clamping structures.

A movable reflector module 110 includes reflectors 112 and 116, and a dispersion compensator plate 114. After the illuminating light is polarized by the polarizer 104, the light is split by the beam splitter 108 before the mask 210 and to recombine the split light after the mask 210 by the optical elements such as the beam splitter 122 and reflectors 112 and 116. The dispersion compensator plate 114 reduces dispersion induced by optical path difference for different electromagnetic wave frequencies. Dispersion is caused by different group/phase velocity of the light depending on its frequency. A shutter 118 opens or closes the light path through the movable reflector module 110. For example, the shutter 118 can be opened to allow the light to travel on the light path 136 from the beam splitter 108 to reflectors 112 and 116, and to the beam splitter 122. A focusing lens 119 transfers a parallel light into a beam which contains all oblique angles of light by focusing.

An objective lens 124 magnifies and projects the (illuminating) light after the mask 120 that has the mask pattern towards an observing device such as a camera 132, e.g., a charge-coupled device (CCD) camera. The focusing lens 119 can be similar to the objective lens 124 in a reverse direction in some embodiments. A numerical aperture (NA) turn table 126 adjusts the NA of the objective lens 124. NA is the range of angles over which the system can accept or emit light such that the NA of a beam is constant as the beam goes from one material to another provided there is no optical power at the interface. NA is a measure of the ability to gather light and resolve fine specimen detail at a fixed object distance. An exemplary NA range is 0.9-1.4.

A Bertrand lens (phase telescope) 128 is moveable to get images of the NA plane (pupil plane, Fourier plane). The Bertrand lens 128 is an optical device used in aligning the various optical components of a microscope. In particular it allows observation of the back focal plane of the objective lens 124 and its conjugate focal planes. The Bertrand lens 128 moves the intermediate image plane to a point where it can be observed. A tube lens 130 is placed before the camera 132 in the microscope apparatus 100, for the purpose of providing a parallel optical path. Images will be projected on the camera 132 after the tube lens 132 to obtain the phase images.

The electric field distribution $E_o$ on the pupil plane at the objective lens 124 is referred to as a near field since it is close to the mask 120. In some examples, the distance between the near field image region to the mask 120 is less than a few wavelengths of the illuminating light. A latent image is an image from the electric field distribution $E_I$ at the camera 132. The phase image acquisition from the mask 120 using the microscope apparatus 100 in FIG. 1, allows reconstructing the near-field image, which helps to precisely predict the latent image on a resist layer of a wafer for real integrated circuit fabrication.

A moving mechanism 134 (e.g., a step motor) moves the movable reflector module 110 by a controlled distance ($\Delta z$) to change the optical path length 136 between the beam splitters 108 and 122 via the reflectors 112 and 116. When the position (z) of the movable reflector module 110 is moved by $\Delta z$, the optical path length 136 is changed by $2\Delta z$. At least two images obtained with the movable reflector module 110 at two different respective z-positions are used to obtain phase information. In at least one embodiment, more detailed phase information is obtained with multiple images from multiple positions of the movable reflector module 110.

Figure 2:
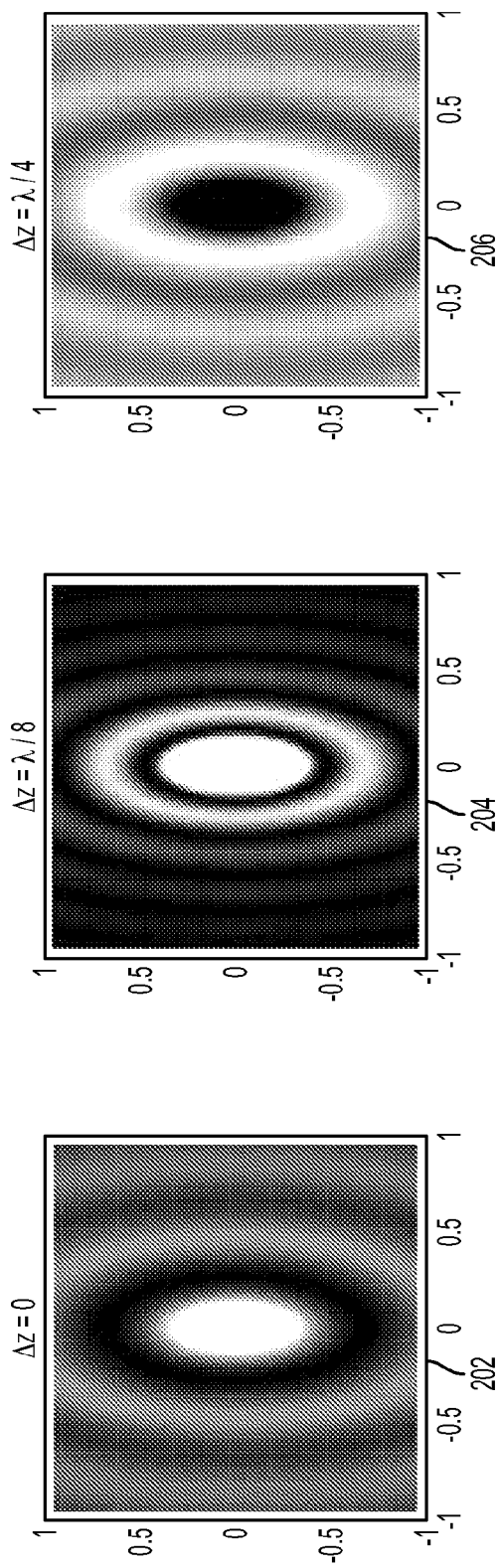
FIG. 2 is a set of exemplary phase images acquired using the microscope apparatus in FIG. 1.

For example, a phase image can be acquired using the camera 132 at an initial position ($\Delta z=0$), then at the second position ($\Delta z=\lambda/8$), and at the third position ($\Delta z=\lambda/4$), where $\lambda$ is the wavelength of the illuminating light. Exemplary phase images in FIG. 2 are acquired using the microscope apparatus 100 in FIG. 1 with intensity variation of each pixel at the (CCD) camera 132. In FIG. 2, a phase image 202 is with $\Delta z=0$, a phase image 204 is with $\Delta z=\lambda/8$, and a phase image 206 is with $\Delta z=\lambda/4$.

Figure 3A:
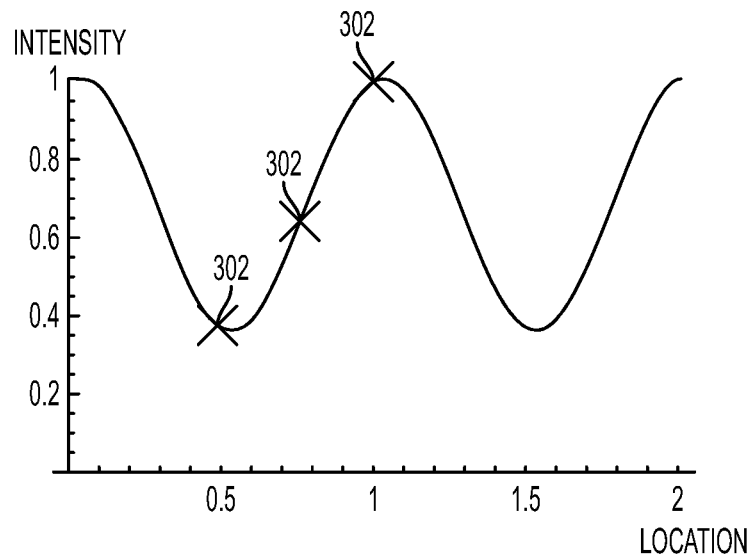
FIGS. 3A and 3B are exemplary intensity plots used to extract phase information.
Figure 3B:
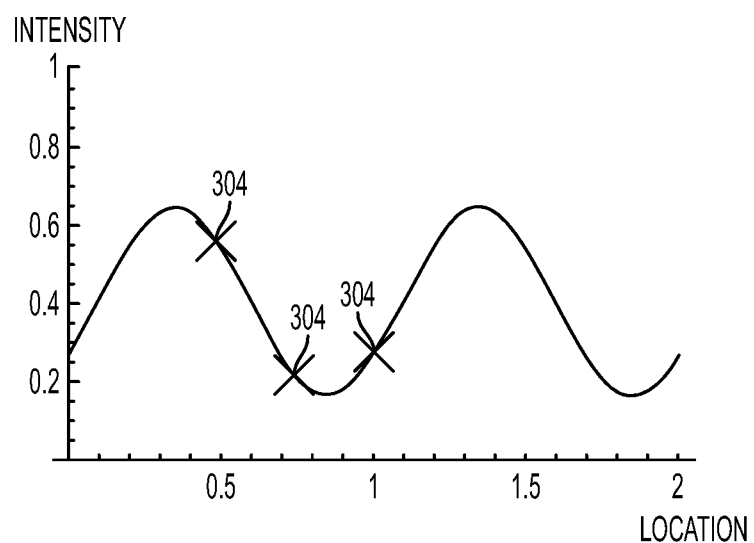

FIGS. 3A and 3B are exemplary intensity plots used to extract phase information. FIG. 3A is an intensity plot with $\Delta z=0$. The intensity plots are obtained from phase images such as shown in FIG. 2 along a z-axis through the center. The intensity can be described by the following equation:

$$\text{Intensity} = |E_0 \text{Exp}(if) + E_r \text{Exp}(-i4\pi\Delta z/\lambda)|^2 \quad \text{Equation (1),}$$

where $E_0$ is a real number light field, Er is a complex number light field, f is phase, z is the position of each sampling point, and $\lambda$ is the wavelength of the light. FIG. 3B is an intensity plot with different z.

By measuring the relative intensity of three sampling points 302 in FIG. 3A and three sampling points 304 in FIG. 3B, the phase f could be determined from Equation (1). More phase images (e.g., three or more) with different z-positions make phases determination more precise and the trends of intensity variations can be more accurately described.

The microscope apparatus 100 is an imaging system to collect the light field from an object (such as a mask 120) to an image plane of the camera 132. The light fields from different light paths interfere with each other at the pupil plane of the NA turn table 126 (from the two light paths split at the beam splitter 108 and recombined/rejoined at the beam splitter 122). As described above, the phase information of the light field can be obtained from the phase images such as FIG. 2.

The phase information can be used to reconstruct the image at a photoresist for a real integrated circuit fabrication when the mask 120 is used. Such image reconstruction is used for advanced integrated circuit technology nodes as the integrated circuit scale shrinks, such as 20 nm technology and beyond, because the image variation through the direction of imaging depth is much larger than previous technology nodes. With an image reconstruction method including the phase information, the photoresist image can be more accurately obtained.

The electric field distribution $E_o$ on the pupil plane at the objective lens 124 is referred to as a near field since it is close to the mask 120. In some examples, the distance between the near field image region to the mask 120 is less than a few wavelengths of the illuminating light. A latent image is an image from the electric field distribution $E_f$ at the camera 132. The phase image acquisition from the mask 120 using the microscope apparatus 100 in FIG. 1, allows reconstructing the near-field image, which helps to precisely predict the latent image on a resist layer of a wafer for real integrated circuit fabrication.

Figure 4:
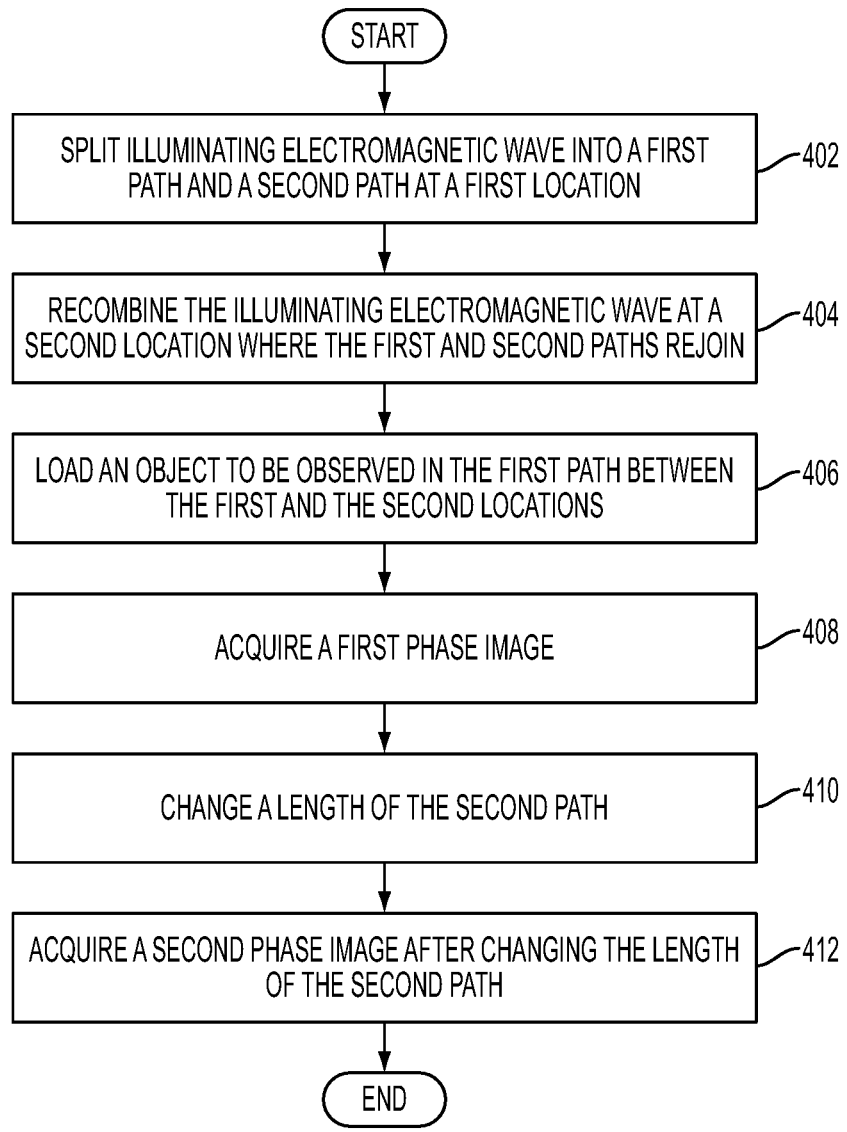
FIG. 4 is a flowchart of an exemplary method of acquiring phase images using the microscope apparatus in FIG. 1 according to some embodiments.

FIG. 4 is a flowchart of an exemplary method of acquiring phase images using the microscope in FIG. 1 according to some embodiments. At step 402, illuminating electromagnetic wave is split into a first path and a second path at a first location. At step 404, the illuminating electromagnetic wave is recombined at a second location where the first and second paths rejoin. At step 406, an object to be observed, such as a photomask for integrated circuit fabrication, is loaded in the first path between the first and the second locations. At step 408, the first phase image is acquired. At step 410, the length of the second path is changed. At step 412, the second phase image is acquired after changing the length of the second path.

Before or during acquiring phase images following the above steps, other steps and adjustments may be performed. For example, the object such as the photomask is loaded in the microscope. The object is aligned for the microscope. In some applications, a C/R (clear reference) position is defined on the object (mask) for acquiring a clear reference image without features. The microscope may automatically adjust the for C/R position during an automated process, then acquire a clear reference image. A position for an objective lens is adjusted for focus. The position of the condenser lens is adjusted to have even illumination on the object. For example, a condenser position is achieved by focusing the image on an observing device such as a CCD camera. The NA is aligned to be centered in the beam path on the pupil plane. The right exposure time is determined for each type of illumination settings to achieve good intensity level on the acquired images from the camera for the desired settings.

The above method embodiment shows exemplary steps, but they are not necessarily required to be performed in the order shown. Steps may be added, replaced, changed order, and/or eliminated as appropriate, in accordance with the spirit and scope of embodiment of the disclosure.

In various embodiments, a condenser lens makes illuminating electromagnetic wave relatively homogeneous. The illuminating electromagnetic wave is polarized before the condenser lens by a polarizer. Changing the length of the second path is achieved by moving reflectors along the second path. An objective lens project illuminating electromagnetic wave propagating after an object to be observed toward an observing device.

The splitting is achieved by a first beam splitter and the recombining is achieved by a second beam splitter. Phase information is obtained based on three sampling points from each intensity plot obtained from the first and second phase images. Dispersion is compensated in the second path by a dispersion compensator plate.

According to some embodiments, a microscope apparatus includes a condenser lens to make illuminating electromagnetic wave relatively homogeneous, a first beam splitter splitting the illuminating electromagnetic wave after the condenser lens, a movable reflector module, a second beam splitter, an objective lens to project illuminating electromagnetic wave propagating after an object to be observed toward an observing device. The object is loaded between the first beam splitter and the second beam splitter. The microscope apparatus is configured to split illuminating electromagnetic wave into two paths at the first beam splitter. A first path goes through the first and the second beam splitters, and a second path goes through the movable reflector module to rejoin the first path at the second beam splitter. The microscope apparatus is configured to acquire phase images with interferences of the electromagnetic wave from the two paths with at least two distance settings of the movable reflector module.

According to some embodiments, a method of acquiring phase images includes splitting illuminating electromagnetic wave into two components along a first path and a second path at a first location. The components of the illuminating electromagnetic wave is recombined at a second location where the first and second paths rejoin. An object to be observed is loaded in the first path between the first and the second locations. A first phase image is acquired. A length of the second path is changed. A second phase image is acquired after changing the length of the second path.

A skilled person in the art will appreciate that there can be many embodiment variations of this disclosure. Although the embodiments and their features have been described in detail, it should be understood that various changes, substitutions and alterations can be made herein without departing from the spirit and scope of the embodiments. Moreover, the scope of the present application is not intended to be limited to the particular embodiments of the process, machine, manufacture, and composition of matter, means, methods and steps described in the specification. As one of ordinary skill in the art will readily appreciate from the disclosed embodiments, processes, machines, manufacture, compositions of matter, means, methods, or steps, presently existing or later to be developed, that perform substantially the same function or achieve substantially the same result as the corresponding embodiments described herein may be utilized according to the present disclosure.

What is claimed is:

1. A microscope apparatus, comprising:
   a condenser lens configured to make an illuminating electromagnetic wave relatively homogeneous;
   a first beam splitter configured to split the illuminating electromagnetic wave after the condenser;
   a movable reflector module;
   a second beam splitter; and
   an objective lens configured to project the illuminating electromagnetic wave propagating after an object to be observed toward an observing device,
   wherein the object is loaded between the first beam splitter and the second beam splitter, the microscope apparatus is configured to split the illuminating electromagnetic wave into two components along two respective paths at the first beam splitter, a first path of the two paths goes through the first and the second beam splitters and a second path of the two paths goes through the movable reflector module to rejoin the first path at the second beam splitter, the microscope apparatus is configured to acquire, from intensity variations at an image plane of the observing device, a first phase image with interferences of the electromagnetic wave from the two paths at a first distance setting of the movable reflector module and a second phase image with interferences of the electromagnetic wave from the two paths at a second distance setting of the movable reflector module, and
   wherein the first phase image and the second phase image are representative of an electric field distribution near the object.

2. The microscope apparatus of claim 1, further comprising a dispersion compensator plate in the movable reflector module.

3. The microscope apparatus of claim 1, further comprising a focusing lens in the movable reflector module.

4. The microscope apparatus of claim 1, further comprising a moving mechanism configured to move the movable reflector module by a controlled distance.

5. The microscope apparatus of claim 1, further comprising a shutter to open or close the second path.

6. The microscope apparatus of claim 1, wherein the observing device is a charge-coupled device (CCD) camera.

7. The microscope apparatus of claim 1, further comprising a polarizer to polarize the illuminating electromagnetic wave before the condenser lens.

8. The microscope apparatus of claim 1, further comprising an electromagnetic wave source.

9. The microscope apparatus of claim 1, further comprising a numerical aperture (NA) turntable.

10. The microscope apparatus of claim 1, further comprising a Bertrand lens.

11. A method of acquiring phase images, comprising:
    splitting an illuminating electromagnetic wave into two components along a first path and a second path at a first location;
    recombining the two components of the illuminating electromagnetic wave at a second location where the first and second paths rejoin;
    loading an object to be observed in the first path between the first and the second locations;
    acquiring, from intensity variations at an image plane of an observing device, a first phase image at a first length of the second path;
    changing a length of the second path; and
    acquiring, from intensity variations at the image plane of the observing device, a second phase image at a second length of the second path,
    wherein the first phase image and the second phase image are representative of an electric field distribution near the object.

12. The method of claim 11, wherein the object is a photomask for integrated circuit fabrication.

13. The method of claim 11, further comprising a condenser lens making the illuminating electromagnetic wave relatively homogeneous.

14. The method of claim 13, further comprising a polarizer polarizing the illuminating electromagnetic wave before the condenser lens.

15. The method of claim 11, wherein changing the length of the second path is achieved by moving reflectors in the second path.

16. The method of claim 11, further comprising an objective lens projecting the illuminating electromagnetic wave propagating after an object to be observed toward an observing device.

17. The method of claim 11, wherein the splitting is achieved by a first beam splitter and the recombining is achieved by a second beam splitter.

18. The method of claim 11, further comprising obtaining phase information based on three sampling points from each intensity plot obtained from the first and the second phase images.

19. The method of claim 11, further comprising a dispersion compensator plate compensating dispersion in the second path.

20. A microscope apparatus, comprising:
    a polarizer configured to polarize an illuminating electromagnetic wave;
    a condenser lens configured to make the illuminating electromagnetic wave relatively homogeneous after the polarizer;
    a first beam splitter configured to split the illuminating electromagnetic wave after the condenser;
    a movable reflector module including a dispersion compensator plate;
    a moving mechanism configured to move the movable reflector module by a controlled distance;
    a second beam splitter; and
    an objective lens configured to project the illuminating electromagnetic wave propagating after an object to be observed toward an observing device,
    wherein the object is loaded between the first beam splitter and the second beam splitter, the microscope apparatus is configured to split the illuminating electromagnetic wave into two components along two paths at the first beam splitter, a first path goes through the first and the second beam splitters and a second path goes through the movable reflector module to rejoin the first path at the second beam splitter, the microscope apparatus is configured to acquire, from intensity variations at an image plane of the observing device, a first phase image with interferences of the electromagnetic wave from the two paths at a first distance setting of the movable reflector module and a second phase image with interferences of the electromagnetic wave from the two paths at a second distance setting of the movable reflector module, and wherein the first phase image and the second phase image are representative of an electric field distribution near the object.

\* \* \* \* \*